United States Patent
Zhu et al.

(10) Patent No.: US 12,219,198 B2
(45) Date of Patent: Feb. 4, 2025

(54) SCREEN PROJECTION METHOD AND APPARATUS, AND PROJECT END

(71) Applicant: Huawei Technologies Co., Ltd., Shenzhen (CN)

(72) Inventors: Chong Zhu, Xi'an (CN); Zhipeng Wu, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 118 days.

(21) Appl. No.: 18/043,296

(22) PCT Filed: Aug. 17, 2021

(86) PCT No.: PCT/CN2021/112885
§ 371 (c)(1),
(2) Date: Feb. 27, 2023

(87) PCT Pub. No.: WO2022/042364
PCT Pub. Date: Mar. 3, 2022

(65) Prior Publication Data
US 2024/0015350 A1     Jan. 11, 2024

(30) Foreign Application Priority Data
Aug. 28, 2020  (CN) .......................... 202010892847.0

(51) Int. Cl.
*G06F 3/14*       (2006.01)
*H04N 21/41*      (2011.01)
*H04N 21/4363*    (2011.01)

(52) U.S. Cl.
CPC .......... *H04N 21/4122* (2013.01); *G06F 3/14* (2013.01); *G06F 3/1454* (2013.01); *H04N 21/43637* (2013.01)

(58) Field of Classification Search
None
See application file for complete search history.

(56) References Cited

U.S. PATENT DOCUMENTS

| | | | |
|---|---|---|---|
| 11,526,325 B2* | 12/2022 | Stankoulov | G06F 3/0488 |
| 2014/0359493 A1* | 12/2014 | Hong | G06F 3/1454 |
| | | | 715/761 |
| 2022/0239718 A1* | 7/2022 | Song | H04L 67/104 |
| 2022/0391161 A1* | 12/2022 | Fan | G06F 3/1423 |

OTHER PUBLICATIONS

Jin et al., "An Approach for QoE-based Media Sharing in DLNA Home Network" copyright 2012 IEEE, 6 pages. (Year: 2012).*

* cited by examiner

Primary Examiner — Amelia L Tapp
(74) Attorney, Agent, or Firm — Slater Matsil, LLP

(57) ABSTRACT

In an embodiment a screen projection method includes determining, by a project end, to-be-projected data when a screen projection function is enabled, obtaining, by the project end, first data permission of the project end for the to-be-projected data and second data permission of a receive end for the to-be-projected data when the to-be-projected data is media data and projecting, by the project end, the to-be-projected data onto the receive end in a screen mirroring manner when the first data permission is higher than the second data permission or projecting, by the project end, the to-be-projected data onto the receive end in a digital living network alliance manner when the first data permission is lower than the second data permission.

20 Claims, 6 Drawing Sheets

SCREEN PROJECTION METHOD AND APPARATUS, AND PROJECT END

This application is a National Stage of International Patent Application No. PCT/CN2021/112885 filed on Aug. 17, 2021, which claims priority to Chinese Patent Application No. 202010892847.0 filed on Aug. 28, 2020. Both of the aforementioned applications are hereby incorporated by reference in their entireties.

TECHNICAL FIELD

This disclosure pertains to the field of screen projection technologies, and in particular, relates to a screen projection method and apparatus, and a project end.

BACKGROUND

With development of science and technology, a number of terminal devices owned by users is increasing gradually. Screen projection and sharing between terminal devices become a daily requirement of users.

Terminal devices in a screen projection system include a project end and a receive end. Common screen projection manners include screen mirroring (Miracast) and digital living network alliance (Digital Living Network Alliance, DLNA). Screen mirroring means that a project end mirrors content on an entire screen of the project end to a corresponding receive end. DLNA is a screen projection solution. Based on a set of protocols for interconnection between computers, mobile terminals, and consumer appliances, DLNA enables a project end to project media data onto a receive end, and the receive end plays the media data to implement screen projection. The media data includes audio, a video, a picture, and the like.

During actual application, a user may choose to use screen mirroring or DLNA to implement screen projection. However, it is found in practice that, regardless of screen mirroring or DLNA, a problem that media data cannot be normally played or play quality is poor often occurs after screen projection. Consequently, a final screen projection effect is poor, and an actual requirement of a user cannot be met.

SUMMARY

In view of this, embodiments of this disclosure provide a screen projection method and apparatus, and a project end, to resolve a problem that a screen projection effect is poor in the conventional technology.

A first aspect of embodiments of this disclosure provides a screen projection method, applied to a project end, and the method includes:

The project end determines to-be-projected data if a screen projection function is enabled;
  the project end obtains first data permission of the project end for the to-be-projected data and second data permission of a receive end for the to-be-projected data if the to-be-projected data is media data; and
  the project end projects the to-be-projected data onto the receive end in a screen mirroring manner if the first data permission is higher than the second data permission; or
  the project end projects the to-be-projected data onto the receive end in a digital living network alliance manner if the first data permission is lower than the second data permission.

In this embodiment of this disclosure, in a case in which the to-be-projected data is media data, data permission of the project end and the receive end are compared. If the project end has higher permission, the to-be-projected data is projected in a screen mirroring manner. In this case, the higher data permission of the project end may be fully used to perform a play operation on the to-be-projected data. If the receive end has higher data permission, the to-be-projected data is projected in a DLNA manner. In this case, the higher data permission of the receive end may be fully used to perform a play operation on the to-be-projected data. According to this embodiment of this disclosure, automatic selection of a screen projection manner can be implemented, to provide a user with higher data permission for the to-be-projected data. Therefore, during actual screen projection, the to-be-projected data may be played by using higher data permission, so that a possibility that the to-be-projected data cannot be normally played due to the data permission is greatly reduced. A smoother final screen projection effect is presented to the user.

In a first possible implementation of the first aspect, the method further includes:

The project end projects the to-be-projected data onto the receive end in a screen mirroring manner if the to-be-projected data is not media data.

When a user needs to perform screen projection on an interface such as a game or a desktop, or needs to perform screen projection on a document, a screen projection manner is automatically selected in this embodiment of this disclosure, to perform screen recording on the interface such as the game, the desktop, or the document, and send recorded screenshot data to the receive end in a manner such as a video stream, to implement adaptive screen projection of non-media data.

In a second possible implementation of the first aspect, the method further includes:

The project end projects the to-be-projected data onto the receive end in a digital living network alliance manner if the first data permission is the same as the second data permission.

The DLNA implements screen projection by pushing a URL of the to-be-projected data, therefore, theoretically, the project end does not need to play the to-be-projected data. In addition, the user may run the screen projection function in the background and normally use another function except the screen projection function. In addition, in the DLNA manner, the receive end may implement a play operation of the to-be-projected data. Therefore, when viewing the to-be-projected data at the receive end, the user may directly perform operations on the receive end, to achieve a better screen projection effect. Finally, when the DLNA manner is used for screen projection, the project end may not keep the screen on, and this saves energy and power and reduces resource waste.

On the basis of the first and the second possible implementations of the first aspect, in a third possible implementation of the first aspect, the method further includes:

The project end obtains first decoding quality of the project end for the to-be-projected data and second decoding quality of the receive end for the to-be-projected data if the first data permission is the same as the second data permission; and
  the project end projects the to-be-projected data onto the receive end in a screen mirroring manner if the first decoding quality is higher than the second decoding quality; or the project end projects the to-be-projected data onto the receive end in a digital living network alliance manner if the first decoding quality is lower than the second decoding quality.

In this embodiment of this disclosure, the data permission of the project end for the to-be-projected data and the data permission of the receive end for the to-be-projected data are first compared. When the data permission of the project end and the receive end are the same, decoding capabilities of the project end and the receive end for the to-be-projected data are compared. If the decoding capability of the project end is higher, the screen mirroring manner is used for screen projection. In this case, the higher decoding capability of the project end may be fully utilized to implement decoding and playing of the to-be-projected data. When the decoding capability of the receive end is higher, the DLNA manner is selected for screen projection. In this case, the higher decoding capability of the receive end may be fully utilized to decode and play the to-be-projected data. According to this embodiment of this disclosure, a screen projection manner can be automatically selected when data permission is the same, to provide a user with a higher decoding capability for to-be-projected data. Therefore, during actual screen projection, the user can view a playing effect of the to-be-projected data under the higher decoding capability. This prevents a case in which the decoding of the to-be-projected data is not smooth or even an error occurs when the decoding capability is low. The screen projection effect is clearer and smoother. Therefore, a better projection effect can be implemented, and user experience can be improved.

On the basis of the third possible implementation of the first aspect, in a fourth possible implementation of the first aspect, the method further includes:

The project end projects the to-be-projected data onto the receive end in a digital living network alliance manner if the first decoding quality is the same as the second decoding quality.

When the decoding capabilities of the project end and the receive end are the same, theoretically, display of the to-be-projected data played by the project end and the receive end is basically the same. However, user experience of screen mirroring and DLNA may be greatly different during actual screen projection. Therefore, to improve the overall screen projection effect, and achieve a convenient operation, the DLNA manner is used for screen projection in this embodiment of this disclosure, to achieve a better screen projection effect.

On the basis of the first and the second possible implementations of the first aspect, in a fifth possible implementation of the first aspect, the method further includes:

The project end determines a first application that can play the to-be-projected data from installed applications; and
obtains a user account of the first application, and determines the first data permission based on the user account.

In this embodiment of this disclosure, the user account in the application in the receive end is used to determine the data permission of the to-be-projected data by the project end. Therefore, in this embodiment of this disclosure, it can be determined whether the project end has the user account that plays the to-be-projected data.

On the basis of the first and the second possible implementations of the first aspect, in a sixth possible implementation of the first aspect, the method further includes:

The project end sends first information of the to-be-projected data to the receive end; and the project end receives the second data permission returned by the receive end for the first information.

To obtain the data permission of the receive end for the to-be-projected data, in this embodiment of this disclosure, the project end sends related information (that is, the first information) of the to-be-projected data to the receive end. The receive end determines the data permission for the to-be-projected data based on the related information. Then, the receive end feeds back the data permission to the project end, to effectively obtain the second data permission.

A second aspect of embodiments of this disclosure provides a screen projection apparatus, including:
  a data determining module, configured to determine to-be-projected data when a screen projection function is enabled;
  a permission obtaining module, configured to obtain first data permission of a project end for the to-be-projected data and second data permission of a receive end for the to-be-projected data when the to-be-projected data is media data;
  a mirroring projection module, configured to project the to-be-projected data onto the receive end in a screen mirroring manner if the first data permission is higher than the second data permission; and
  a digital projection module, configured to project the to-be-projected data onto the receive end in a digital living network alliance manner if the first data permission is lower than the second data permission.

A third aspect of embodiments of this disclosure provides a project end, where the project end includes a memory and a processor, the memory stores a computer program that can be run on the processor, and when the processor executes the computer program, the project end is enabled to implement the steps of the screen projection method according to any one of the implementations of the first aspect.

A fourth aspect of embodiments of this disclosure provides a computer-readable storage medium, where the computer-readable storage medium stores a computer program, and when the computer program is executed by a processor, a project end is enabled to implement the steps of the screen projection method according to any one of the implementations of the first aspect.

A fifth aspect of embodiments of this disclosure provides a computer program product. When the computer program product is run on a project end, the project end is enabled to perform the screen projection method according to any one of the implementations of the first aspect.

A sixth aspect of embodiments of this disclosure provides a chip system, where the chip system includes a processor, the processor is coupled to a memory, and the processor executes a computer program stored in the memory, to implement the screen projection method according to any one of the implementations of the first aspect.

The chip system may be a single chip or a chip module including a plurality of chips.

It may be understood that, for beneficial effects of the second aspect to the sixth aspect, refer to related descriptions in the first aspect. Details are not described herein again.

DETAILED DESCRIPTION OF ILLUSTRATIVE EMBODIMENTS

Figure 1:
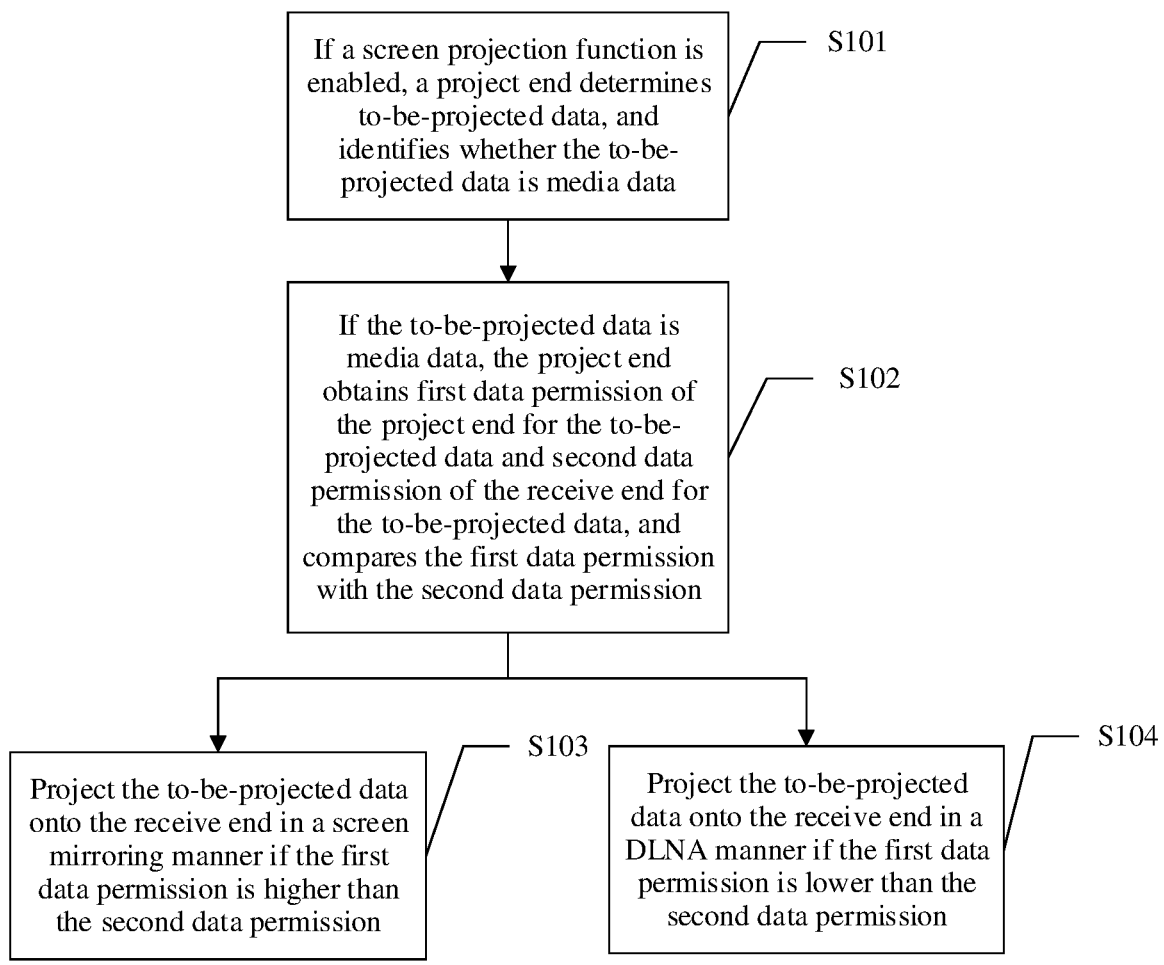
FIG. 1 is a schematic flowchart of a screen projection method according to an embodiment of this disclosure.

In the following description, for illustration instead of limitation, specific details such as a particular system structure and a technology are provided to facilitate a thorough understanding of embodiments of this disclosure. However, a person skilled in the field should know that this disclosure may also be implemented in other embodiments without these specific details. In other cases, detailed descriptions of well-known systems, apparatuses, circuits, and methods are omitted, so that this disclosure is described without being obscured by unnecessary details.

For ease of understanding of this disclosure, embodiments of this disclosure are briefly described herein first.

Terminal devices in a screen projection system include a project end and a receive end. To-be-projected data (that is, data that needs to be projected) may be classified into two types: media data and non-media data. The media data includes audio, video, picture, and the like. The non-media data includes all types of data except the media data, for example, an interface and a document. Common screen projection manners include screen mirroring and DLNA.

The screen mirroring means that the project end takes a screenshot of content displayed on a screen of the project end, and synchronously sends recorded screenshot data to the receive end, so that the receive end plays the screenshot data, to complete screen projection.

The DLNA is a screen projection solution designed to implement interconnection between wireless and wired networks, including computers, consumer appliances (such as TVs), and mobile terminals, making unlimited sharing and growth of digital media and content services possible. The DLNA includes a plurality of protocols for interconnection between computers, mobile terminals, and consumer appliances. By complying with and using these protocols, media data of a project end may be pushed to a receive end in a form of a data address (Uniform Resource Locator, URL). The receive end plays the media data based on the received data address, to implement screen projection of the media data. When screen projection is performed in a DLNA manner, the project end may exit a playback screen and perform other operations.

A comparison of screen mirroring and DLNA reveals the following differences.

On the one hand, in the screen mirroring manner, a receive end only needs to play received screenshot data. Therefore, a low requirement on a decoding capability of the receive end for media data is imposed. However, correspondingly, screen mirroring requires that a project end has a strong media data decoding capability, so that the project end can decode and play the media data and display the non-media data. However, in DLNA, because a receive end obtains media data by using the URL and plays the media data, the receive end needs to have a certain decoding capability. In this case, a low requirement on a decoding capability of a project end is imposed.

On the other hand, data permission for to-be-projected data of different terminal devices may vary to some extent. The data permission refers to permission of the terminal device to play the media data. The data permission includes whether the terminal device has permission to play the to-be-projected data completely, and whether the terminal device has permission to decrypt the to-be-projected data if the to-be-projected data is encrypted. The data permission determines whether the terminal device can normally play the to-be-projected data. On this basis, when the data permission for the to-be-projected data of the project end is higher than that of the receive end, if the DLNA manner is selected to perform screen projection of the to-be-projected data, a user can only play the to-be-projected data in a manner with lower permission. In contrast, when the data permission for the to-be-projected data of the project end is lower than that of the receive end, if the screen mirroring manner is selected to perform screen projection of the to-be-projected data, the user also can only play the to-be-projected data in a manner with lower permission. For example, it is assumed that the to-be-projected data is a network video, the project end is a mobile phone, and the receive end is a computer. If the mobile phone has a very important person (Very Important Person, VIP) account of a video platform (used to play the network video), the computer has a common account of the video platform, and the VIP account can play the network video completely, while the common account can play the network video only for the first 30 seconds, only the first 30 seconds of the network video can be played on the receive end if the DLNA manner is used for screen projection of the network video. In contrast, if the phone has a common account and the computer has a VIP account, the user can view the network video only for the first 30 seconds on the receive end if the screen mirroring manner is used for screen projection.

It can be learned from the foregoing comparative analysis of the screen mirroring and the DLNA that, both the data permission and the decoding capabilities of the project end and the receive end affect the final screen projection effect of the to-be-projected data. That is, whether the to-be-projected data can be normally played at the receive end, and smoothness and definition of the to-be-projected data when played are affected. During actual application, a user may choose to use screen mirroring or DLNA to implement screen projection as needed. However, regardless of the manner, only the data permission and decoding capability of one of the project end or the receive end can be used. For example, in the screen mirroring manner, the data permission and decoding capability of the project end are used; and in the DLNA manner, the data permission and decoding capability of the receive end are used. Therefore, if the user selects an improper screen projection manner, projected data cannot be normally played, or the played sound quality, definition, and smoothness are poor, that is, the screen projection effect is poor, and user experience deteriorates.

To improve a screen projection effect, in this embodiment of this disclosure, when performing screen projection, a project end first identifies whether to-be-projected data is media data. When the to-be-projected data is media data, data permission of the project end for the to-be-projected data and data permission of the receive end for the to-be-projected data are obtained, and the data permission are compared. If the project end has higher data permission, screen projection is performed in a screen mirroring manner.

In this case, the data permission of the project end may be fully utilized to play the to-be-projected data. If the receive end has higher data permission, screen projection is performed in a DLNA manner. In this case, the data permission of the receive end may be fully utilized to play the to-be-projected data. According to this embodiment of this disclosure, automatic selection of a screen projection manner can be implemented, to provide the user with higher data permission for the to-be-projected data. Therefore, during actual screen projection, the user may play the to-be-projected data by using higher data permission, to prevent a case in which the to-be-projected data cannot be normally played due to low data permission. Therefore, in this embodiment of this disclosure, a better screen projection effect can be achieved, and user experience can be improved.

In addition, some terms that may be used in this embodiment of this disclosure are described as follows:

To-be-projected data: The to-be-projected data refers to data that needs to be projected. In embodiments of this disclosure, the to-be-projected data is classified into two types: media data and non-media data. The media data includes audio, video, picture, and the like. The non-media data includes all data except the media data, for example, an interface, a document, and the like. A type of the to-be-projected data needs to be determined based on an actual application scenario.

Project end and receive end: In embodiments of this disclosure, the project end is a terminal device that projects to-be-projected data; and the receive end refers to a terminal device that receives the to-be-projected data and plays or displays the to-be-projected data. On a basis that DLNA is supported, device types of the project end and the receive end are not excessively limited in embodiments of this disclosure. Both the project end and the receive end may be terminal devices such as a mobile phone, a television, a personal computer, a tablet computer, or a wearable device, and may be specifically determined based on an actual application scenario. For example, in an actual scenario, when a mobile phone performs screen projection to a smart watch and a television, the mobile phone is a project end, and both the smart watch and the television are receive ends. The project end is an execution body of the screen projection method provided in this embodiment of this disclosure.

Data permission (including first data permission and second data permission): to provide a differentiated media service for a user, or to ensure security of media data. During actual application, different data permission is usually set for different terminal devices, to flexibly control playing operations performed by the different terminal devices on media data. For example, some video platforms provide common accounts and VIP accounts for users. VIP accounts have permission to play VIP videos completely, while common accounts can only watch part of the VIP videos. When a user watches a VIP video on a video platform on a terminal device, video data permission of the terminal device varies based on a user account. For another example, for some media data with a high security level, encryption processing may be performed, and security levels of different terminal devices may be implemented. Only when the security level reaches a certain threshold, the terminal device has the permission to decrypt and play the data. Alternatively, media data is not encrypted, but corresponding security levels are set for different terminal devices. In addition, the terminal device has the permission to access and play the data only when the security level reaches a certain threshold. Therefore, for a single piece of media data, even if the terminal device has software and hardware configurations for playing the media data, it is difficult for the terminal device to normally play the media data without corresponding data permission theoretically. In this embodiment of this disclosure, specific permission content included in the data permission may be set by a person skilled in the art based on an actual situation. For example, only "whether there is a VIP account" or "security level of the terminal device" may be included. Alternatively, both "whether there is a VIP account" and "security level of the terminal device" may be included. Another permission may also be included, such as "whether encrypted media data can be decrypted".

It should be noted that the data permission may be bound to the terminal device, or may be bound to a user account in the terminal device, or may be bound to an account of an application in the terminal device. An actual situation depends on actual media data. For example, when the media data is offline media data, (for example, media data locally stored in the terminal device, or media data that is stored locally at the project end and that is received by the receive end), the media data may be bound to a physical address of the terminal device, or may be bound to a user account logged in to the terminal device. When the media data is online media data (for example, a network video provided by some video platforms, where a specific application needs to be used to access and play the online media data, for example, a client of the video platform or a browser needs to be used to access and play the online media data), the media data may be bound to a login account logged in to the specific application in the terminal device.

Decoding capability: With development of science and technology, users have higher and higher requirements on quality of media data, therefore, more and more high-quality media data appears in the market, such as lossless music, 4K movies, and 8K images, where 4K refers to a resolution of 3840×2160 and 8K refers to a resolution of 7680×4320. To play high-quality media data, the terminal device needs to have a corresponding decoding capability, that is, a capability of restoring data to playable audio, video, or picture.

In actual application, different terminal devices have different decoding capabilities for media data. When a decoding capability of the terminal device is weaker than data that needs to be decoded, it is very likely that decoding fails and the data cannot be played, or indicators such as voice quality, definition, and smoothness deteriorate even if decoding can be performed. For example, when a video decoding capability of a terminal device is weak, for example, the terminal device supports decoding of a 1080p video, if the terminal device needs to decode and play a 4K movie, frame freezing during playback may occur, or sounds can be heard but no images are displayed, or even the video cannot be played at all. Similarly, if a terminal device has a weak audio decoding capability, when the terminal device decrypts high-quality audio, audio playback freezes or even the audio cannot be played at all. It can be learned that, the decoding capability of the project end and the receive end for the media data affects indicators such as sound quality, definition, and smoothness of the media data played during final projection, and further affects the quality of the final projection to a certain extent. Therefore, in some embodiments of this disclosure, a decoding capability of the project end for the to-be-projected data and a decoding capability of the receive end for the to-be-projected data are compared, to assist in automatic selection of a screen projection manner.

To describe the technical solutions of this disclosure, the following uses specific embodiments for description.

FIG. 1 is an implementation flowchart of a screen projection method according to Embodiment 1 of this disclosure. Details are as follows:

S101: If a screen projection function is enabled, a project end determines to-be-projected data, and identifies whether the to-be-projected data is media data.

In this embodiment of this disclosure, the project end has a screen projection function. This function may be a function built in a software system of the project end or a function of an application installed in the project end. An actual situation may be determined based on an actual scenario. In addition, a manner of enabling the screen projection function is not excessively limited in this embodiment of this disclosure, and may be determined based on an actual scenario. A user may enable the screen projection function by operating the project end. Alternatively, the screen projection function of the project end may be remotely enabled by sending an enabling instruction to the project end by another device. For example, when the screen projection function is a built-in function of the software system of the project end, the screen projection function may be set to a function in system settings of the software system. During use, the user may perform an operation in system settings to enable the screen projection function. Alternatively, a shortcut enabling manner may be provided for the screen projection function by using a home screen icon, a floating window, a drop-down notification bar, or the like. During use, the user may quickly enable the screen projection function by tapping a corresponding icon or area. When the screen projection function is a function of an application, a developer of the application may set an enabling mode of the screen projection function based on an actual requirement. For example, for a video platform, a screen projection icon may be set on a video play interface. The user enables the screen projection function by tapping the icon.

After the screen projection function is enabled, the project end first determines the data that needs to be projected (that is, the to-be-projected data) this time. A manner of determining the to-be-projected data may vary with actual settings of the screen projection function. This may be specifically determined based on an actual scenario, and is not limited herein. For example, it may be set that in a process of enabling the screen projection function, to-be-projected data needs to be selected first, for example, a video, audio, or a picture may be selected, or a screen projection interface or a document may be selected. The screen projection function is enabled only after the to-be-projected data is selected. In this case, if the screen projection function is enabled, the to-be-projected data may be determined based on a selection status. For another example, for an application such as a video platform, a screen projection icon may be set on an interface for playing media data, and media data played on a current interface is set to corresponding to-be-projected data. In this case, if the screen projection function is enabled, the media data played on the current interface is used as the to-be-projected data.

After the to-be-projected data is determined, whether the to-be-projected data is media data is identified in this embodiment of this disclosure, that is, whether the to-be-projected data is audio, a video, or a picture is identified. If the to-be-projected data is any one of the data, it may be determined that the to-be-projected data is media data. On the contrary, if the to-be-projected data is not audio, a video, or a picture, it may be determined that the to-be-projected data is not media data (that is, the to-be-projected data is non-media data).

S102: If the to-be-projected data is media data, the project end obtains first data permission of the project end for the to-be-projected data and second data permission of a receive end for the to-be-projected data, and compares the first data permission with the second data permission.

When the to-be-projected data is media data, to play the media data with maximum permission, and achieve a better screen projection effect, in this embodiment of this disclosure, the data permission (that is, the first data permission and the second data permission) of the project end and the receive end for the to-be-projected data is obtained. The project end may obtain the first data permission by reading the data permission of the project end for the to-be-projected data. For example, in some optional embodiments, when the data permission is determined based on "whether there is a VIP account", an application (that is, a first application) that can play the to-be-projected data may be first determined from applications installed on the project end, for example, a video player. Then, a user account in the application is obtained, and whether the project end has data permission to play the to-be-projected data is determined based on the user account. For the second data permission of the receive end for the to-be-projected data, the project end needs to request corresponding data from the receive end.

To implement the request for the second data permission, in this embodiment of this disclosure, the project end may send related information (that is, first information) of the to-be-projected data to the receive end. After receiving the related information, the receive end reads the data permission (that is, the second data permission) of the receive end for the to-be-projected data, and sends the data permission to the project end. The related information may be attribute data of the to-be-projected data, for example, a data type, a data size, and resolution, or may be play information related to the to-be-projected data. For example, when the to-be-projected data has a security level requirement on a terminal device, the data can be played only when a security level of the terminal device reaches a preset level or higher. In this case, the play information may be a security level requirement. For another example, when the to-be-projected data is an online video of a video platform, the play information may be video platform information of the video platform, for example, may be a name of the video platform or a unique identifier of an application of the video platform. In this way, the receive end may uniquely determine the video platform, and determine whether the receive end has a corresponding video platform VIP account, or whether the receive end has corresponding video-on-demand permission, or the like.

Figure 2:
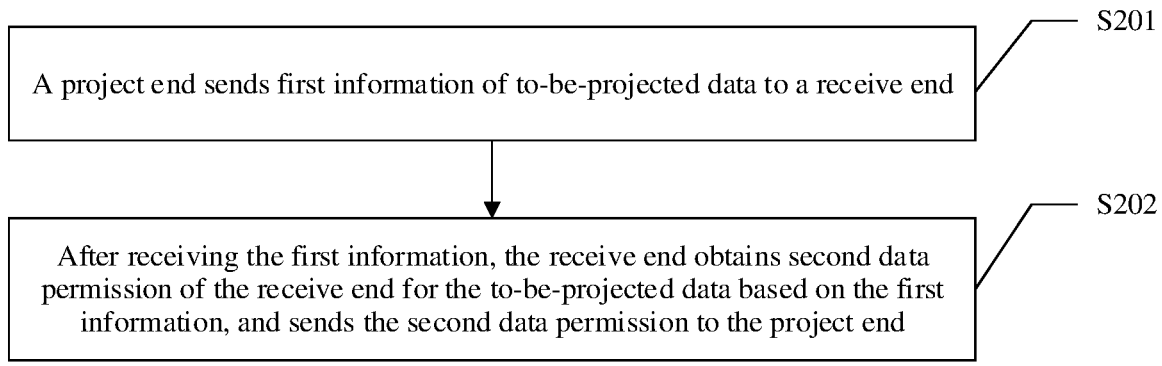
FIG. 2 is a schematic flowchart of a screen projection method according to an embodiment of this disclosure.

Correspondingly, as shown in FIG. 2, a request operation for the second data permission may be as follows:

S201: The project end sends first information of the to-be-projected data to the receive end.

S202: After receiving the first information, the receive end obtains the second data permission of the receive end for the to-be-projected data based on the first information, and sends the second data permission to the project end.

In this case, that the project end obtains the second data permission of the receive end for the to-be-projected data may be replaced with: The project end sends the first information of the to-be-projected data to the receive end, and receives the second data permission returned by the receive end for the first information.

To obtain the data permission of the receive end for the to-be-projected data, in this embodiment of this disclosure, the project end sends the related information (that is, the first information) of the to-be-projected data to the receive end. For example, when the to-be-projected data is an online video of a video platform, and the data permission includes only "whether there is a VIP account", the related information may be information about the video platform that plays the to-be-projected data. After receiving the video platform information, the receive end reads an account status of the receive end on the video platform (the account can be obtained by starting the application on the video platform) and returns a result indicating whether the account is a VIP account to the project end. Alternatively, the related information may be a URL of the online video. When receiving the URL, the receive end determines the corresponding video platform or video platform application based on the URL, obtains an account status of the receive end on the video platform, and returns a result indicating whether the account is a VIP account to the project end.

For another example, when the to-be-projected data is local media data (such as local audio, video, or picture) in the project end, if the local media data is data with high confidentiality, and a terminal device with a high security level is required to play the local media data, that is, the data permission includes "security level of the terminal device", the related information may include a security level requirement of the local media data. For example, assuming that the requirement is "level 2 or higher", after receiving the security level requirement, the receive end sends the security level of the receive end to the project end, or the receive end determines whether the security level of the receive end meets the security level requirement, and returns a determining result to the project end.

It should be noted that, based on different forms of the screen projection function in the terminal devices (including the project end and the receive end), manners of obtaining the data permission may also be different to some extent. For example, in some optional embodiments, when the screen projection function exists in the software system, the data permission of the software system of the terminal device and the data permission of a hardware component for the to-be-projected data may be read, for example, security levels of the software system and the hardware component. When the screen projection function exists in the application, any one or two pieces of the data permission of the software system and the hardware component of the terminal device and the data permission of the application and the data permission for the to-be-projected data may be obtained based on a requirement, for example, two data permission may be obtained, and the obtained two data permission are combined to be a final data permission of the to-be-projected data of the terminal device. For example, when the to-be-projected data is encrypted, the terminal device needs to obtain a decryption permission of the to-be-projected data. The terminal device may obtain the decryption permission of the software system and the hardware component of the terminal device for the to-be-projected data, and the data permission of the application installed in the terminal device for the to-be-projected data, and combine the permission. If both permission cannot be decrypted, it is determined that the terminal device does not have the decryption permission. If one or two data permission can be decrypted, it is determined that the terminal device has the decryption permission.

After the data permission of the project end and the receive end for the to-be-projected data are obtained, in this embodiment of this disclosure, the two data permission are compared, and an end with higher data permission is determined. A method for comparing data permission is not excessively limited in this embodiment of this disclosure, and may be set by a person skilled in the art. For example, in some optional embodiments, when the data permission includes only one piece of content, a level of the content may be directly compared. For example, when the data permission includes only "whether there is a VIP account", VIP account statuses of the project end and the receive end may be directly compared. If both ends have VIP accounts or neither end has a VIP account, it may be determined that the project end and the receive end have a same data permission. If one end has a VIP account but the other end does not have a VIP account, it may be determined that the data permission of the end that has a VIP account is higher. However, in some other optional embodiments, when the data permission includes a plurality of pieces of content, weight coefficients may be set for different content. After comparing the content one by one, the level of the data permission is determined based on the weight coefficient. When the weight coefficients of each content are the same, it is equivalent to comparing data permission by using a voting method.

S103: Project the to-be-projected data onto the receive end in a screen mirroring manner if the first data permission is higher than the second data permission.

When the first data permission is higher than the second data permission, it indicates that the data permission of the project end is higher. Therefore, in this case, the screen mirroring manner is used for screen projection in this embodiment of this disclosure. That is, the project end plays the to-be-projected data based on the data permission of the project end. For example, the project end plays the online video by using a VIP account, or decrypts the encrypted to-be-projected data and then plays the data. In addition, the project end takes a screenshot and records the screen interface when the to-be-projected data is played, and then sends recorded screenshot data to the receive end in a manner such as a video stream. Correspondingly, the receive end may implement screen projection and playing of the to-be-projected data by playing the received screenshot data. In this case, the user may view the to-be-projected data at the receive end, and may control, at the project end, a play operation of the to-be-projected data, for example, control a video playback progress, an audio volume, or an image zoom ratio. Details of operations in the screen mirroring manner are not excessively limited in this embodiment of this disclosure, and may be set by a person skilled in the art based on a requirement.

S104: Project the to-be-projected data onto the receive end in a DLNA manner if the first data permission is lower than the second data permission.

When the second data permission is higher than the first data permission, it indicates that the data permission of the receive end is higher. Therefore, in this case, the DLNA manner is used for screen projection in this embodiment of this disclosure. That is, the project end sends a URL of the to-be-projected data to the receive end. The receive end obtains the to-be-projected data based on the URL, and plays the to-be-projected data based on the data permission of the receive end. For example, the receive end plays the online video by using a VIP account, or decrypts the encrypted to-be-projected data and then plays the data. In this case, the user may view the to-be-projected data at the receive end, and may control, at the receive end, a play operation of the to-be-projected data, for example, control a video playback progress, an audio volume, or an image zoom ratio. Details of operations in the DLNA manner are not excessively limited in this embodiment of this disclosure, and may be set by a person skilled in the art based on a requirement.

In this embodiment of this disclosure, in a case in which the to-be-projected data is media data, data permission of the project end and the receive end are compared. If the project end has higher permission, the to-be-projected data is projected in a screen mirroring manner. In this case, the higher data permission of the project end may be fully used to perform a play operation on the to-be-projected data. If the receive end has higher data permission, the to-be-projected data is projected in a DLNA manner. In this case, the higher data permission of the receive end may be fully used to perform a play operation on the to-be-projected data. According to this embodiment of this disclosure, automatic selection of a screen projection manner can be implemented, and the user is always provided with higher data permission for the to-be-projected data. Therefore, in an actual screen projection process, the to-be-projected data may be played by using higher data permission, so that a possibility that the to-be-projected data cannot be normally played due to the data permission is greatly reduced. A smoother final screen projection effect is presented to the user.

In an optional embodiment of this disclosure, during actual application, data permission of the project end and the receive end for the to-be-projected data may also be the same. That is, a result of S102 may be that the first data permission is the same as the second data permission. In this case, no matter which end is selected to play the to-be-projected data, theoretically, an impact of permission on the playback is the same. Based on this, in this embodiment of this disclosure, after S102, screen mirroring or DLNA may be used to implement screen projection of the to-be-projected data.

Considering that in an actual application scenario of screen projection, if screen mirroring is used for screen projection, a user needs to perform a play operation on the project end, and a play interface of to-be-projected data in the project end needs to be maintained. In this case, the following problems may occur:

1. It is difficult for the user to use functions other than the screen projection function of the project end. For example, when the project end is a mobile phone, and the to-be-projected data is a video, screen mirroring requires the user to keep a video playing interface in the phone. In this case, if the user exits the video playing interface and uses other functions, for example, a phone call or an SMS message function, screen projection cannot be performed properly.
2. The project end and the receive end may be far away from each other, and it is inconvenient for the user to operate the project end. For example, when a desktop computer in a bedroom is used to project on a television in a living room, if the user needs to perform an operation such as pausing or fast-forwarding the to-be-projected data, the user needs to go to the bedroom to perform the operation. This is very inconvenient.
3. Screen mirroring usually requires that the screen of the project end is steady on, which leads to high power consumption of the project end and waste of resources.

Figure 3:
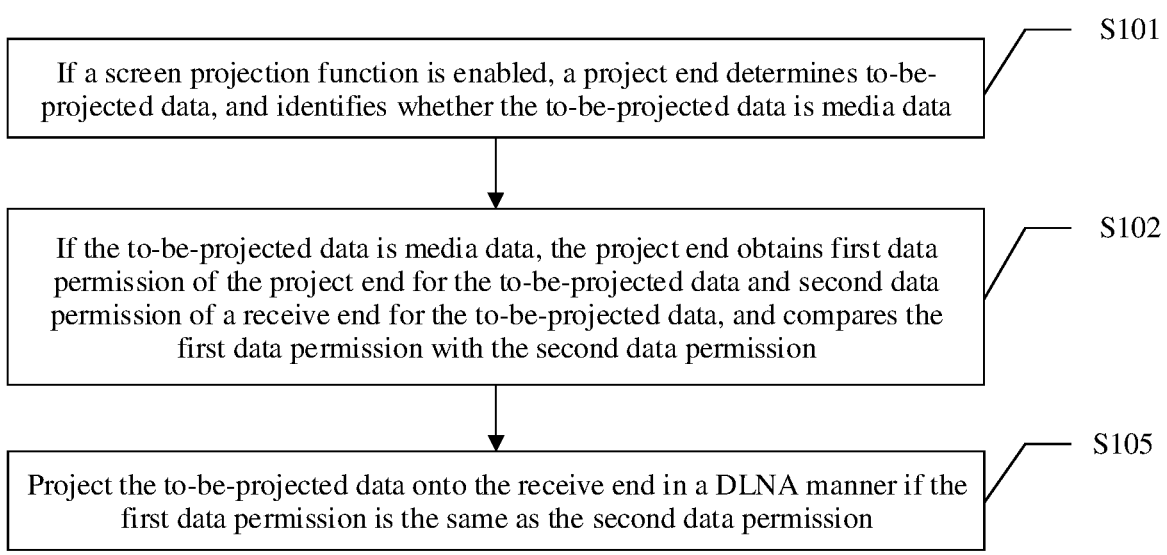
FIG. 3 is a schematic flowchart of a screen projection method according to an embodiment of this disclosure.

To resolve the foregoing problems and improve the screen projection effect and user experience, in an optional embodiment of this disclosure, as shown in FIG. 3, after S102, the method further includes the following steps.

S105: Project the to-be-projected data onto the receive end in a DLNA manner if the first data permission is the same as the second data permission.

The DLNA implements screen projection by pushing a URL of the to-be-projected data. Therefore, theoretically, the project end does not need to play the to-be-projected data. In addition, the user may run the screen projection function in the background and normally use another function except the screen projection function. In addition, in the DLNA manner, the receive end may implement a play operation of the to-be-projected data, for example, pause, fast-forward, and volume adjustment of audio and video, and zoom-in or zoom-out of a picture. Therefore, when viewing the to-be-projected data at the receive end, the user may directly operate the receive end, and does not need to perform an operation on the project end. Finally, when the DLNA manner is used for screen projection, the project end may not keep the screen on, and this saves energy and power and reduces resource waste. Based on these reasons, in this embodiment of this disclosure, when it is determined that data permission of the project end and the receive end are the same, the to-be-projected data is projected in a DLNA manner. In this case, the screen projection effect is better for the user.

Correspondingly, based on the embodiment shown in FIG. 1, a corresponding screen projection method decision-making table in this embodiment of this disclosure may be shown in Table 1.

TABLE 1

| Project end | Receive end | |
| --- | --- | --- |
| | Second data permission | Second data permission |
| First data permission | The data permission of the two ends is the same, and the DLNA manner is used for screen projection | The project end has higher data permission, and the screen mirroring manner is used for screen projection |
| First data permission | The receive end has higher data permission, and the DLNA manner is used for screen projection | The data permission of the two ends is the same, and the DLNA manner is used for screen projection |

In Table 1, data permission comparison results of the project end and the receive end are classified into four types: the data permission of the project end is higher; the data permission of the project end and the receive end are high and the same; the data permission of the receive end is higher; and the data permission of the project end and the receive end is low and the same, and corresponding projection manners are set. During actual application, a screen projection manner may be determined based on the comparison result, to implement automatic decision on the screen projection manner.

In this embodiment of this disclosure, steps S104 and S105 may be combined as follows: Project the to-be-projected data onto the receive end in a DLNA manner if the first data permission is lower than or equal to the second data permission.

Figure 4:
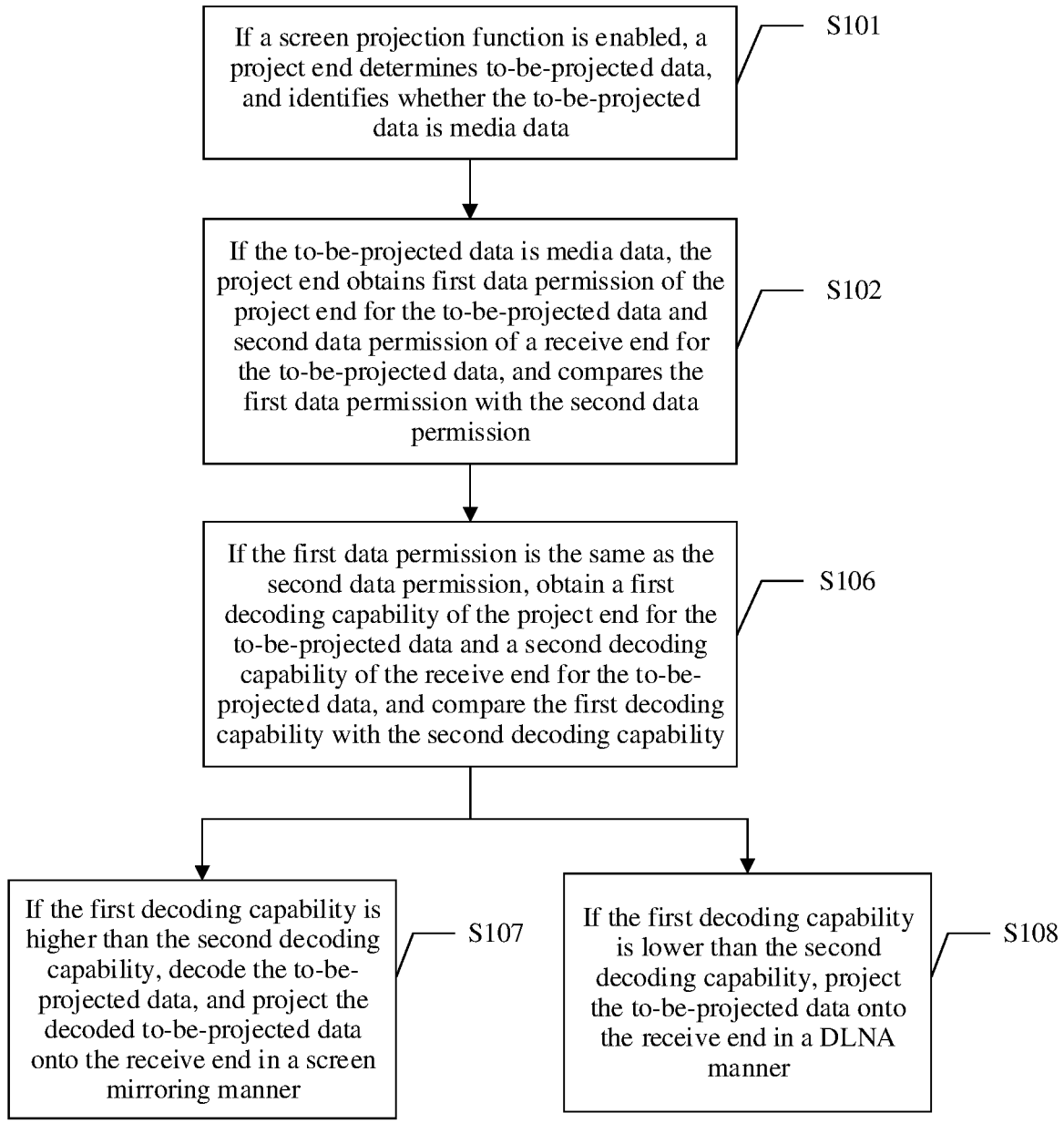
FIG. 4 is a schematic flowchart of a screen projection method according to an embodiment of this disclosure.

In another optional embodiment of this disclosure, during actual application, the data permission of the project end and the receive end for the to-be-projected data may be the same. That is, a result of S102 may be that the first data permission is the same as the second data permission. In this case, no matter which end is selected to play the to-be-projected data, theoretically, an impact of permission on the playback is the same. During actual application, it is found that, in addition to the data permission, a decoding capability of the project end for the media data also greatly affects the playing effect of the media data, for example, whether frame freezing occurs and how definition is. In a screen projection scenario, a final screen projection effect of the media data is affected. Therefore, in a case in which the two ends have the same data permission, to finally implement better decoding and playing of the to-be-projected data, a decoding capability of the project end and a decoding capability of the receive end continue to be compared in this embodiment of this disclosure. As shown in FIG. 4, after S102, the method further includes the following steps.

S106: If the first data permission is the same as the second data permission, obtain a first decoding capability of the project end for the to-be-projected data and a second decoding capability of the receive end for the to-be-projected data, and compare the first decoding capability with the second decoding capability.

During actual application, decoding is divided into hardware decoding and software decoding. Software decoding means that media data is decoded by using a CPU, and computing resources of the CPU need to be consumed. Hardware decoding is to decode media data by using hardware other than a CPU, for example, decode media data by using a GPU or a hardware decoder.

To better decode the to-be-projected data, and present a better final screen projection effect to the user, in this embodiment of this disclosure, decoding capabilities (that is, the first decoding capability and the second decoding capability) of the project end and the receive end for the to-be-projected data are obtained, and the first decoding capability and the second decoding capability are compared. The first decoding capability may be obtained by reading, by the project end, a hardware decoding capability and a software decoding capability for a data type of the to-be-projected data. For example, when the type of the to-be-projected data is a video, the project end reads a video decoding capability supported by the project end, for example, 1080p and 4K. For the second decoding capability, the receive end needs to read a hardware decoding capability and a software decoding capability of the receive end for the to-be-projected data based on the data type of the to-be-projected data, obtain a final decoding capability, and feed back the final decoding capability to the project end. To enable the receive end to obtain the type of the to-be-projected data, the project end may send the type of the to-be-projected data to the receive end. When applied in combination with the embodiment shown in FIG. 2, if the receive end can determine the type of the to-be-projected data based on the first information, for example, the first information carries the type of the to-be-projected data, or the first information is a URL and the receive end determines the type of the to-be-projected data by using the URL, the project end does not need to send the type of the to-be-projected data to the receive end.

In some optional embodiments, considering that it is sometimes difficult to obtain both the hardware decoding capability and the software decoding capability, the project end and the receive end may obtain only the hardware decoding capability or the software decoding capability when obtaining the decoding capability of the project end and the receive end. This may be specifically set by a skilled person based on an actual situation, and is not limited herein.

S107: If the first decoding capability is higher than the second decoding capability, decode the to-be-projected data, and project the decoded to-be-projected data onto the receive end in a screen mirroring manner.

When the first decoding capability is higher than the second decoding capability, it indicates that the project end has a higher decoding capability for the to-be-projected data. For example, it is assumed that the type of the to-be-projected data is a video, and it is assumed that the project end supports both 1080p decoding and playing of a video and 4K decoding and playing of a video, while the receive end supports only 1080p decoding and playing of a video. In this case, the project end has a higher decoding capability of 4K. When the project end is used to decode and play the to-be-projected data, theoretically, indicators such as smoothness and definition during decoding and playing of the project end are higher than those of the receive end with a lower decoding capability. Therefore, in this embodiment of this disclosure, the screen mirroring manner is used to implement screen projection of the to-be-projected data. That is, the project end decodes and plays the to-be-projected data by using the decoding capability of the project end, and performs screen recording and transmission at the same time as the playback. For specific description of the screen projection manner of screen mirroring, refer to the description in S103. Details are not described herein again.

S108: If the first decoding capability is lower than the second decoding capability, project the to-be-projected data onto the receive end in a DLNA manner.

When the second decoding capability is higher than the first decoding capability, it indicates that the receive end has a higher decoding capability for the to-be-projected data. For example, it is assumed that the type of the to-be-projected data is a video, and it is assumed that the project end supports only 1080p decoding and playing of a video, while the receive end supports both 1080p decoding and playing of a video and 4K decoding and playing of a video. In this case, the receive end has a higher decoding capability of 4K. When the receive end is used to decode and play the to-be-projected data, theoretically, indicators such as smoothness and definition during decoding and playing of the project end are higher than those of the project end with a lower decoding capability. Therefore, in this embodiment of this disclosure, the DLNA manner is used to implement screen projection of the to-be-projected data. That is, the receive end decodes and plays the to-be-projected data by using the decoding capability of the receive end. For specific description of the screen projection manner of DLNA, refer to the description in S104. Details are not described herein again.

Figure 5:
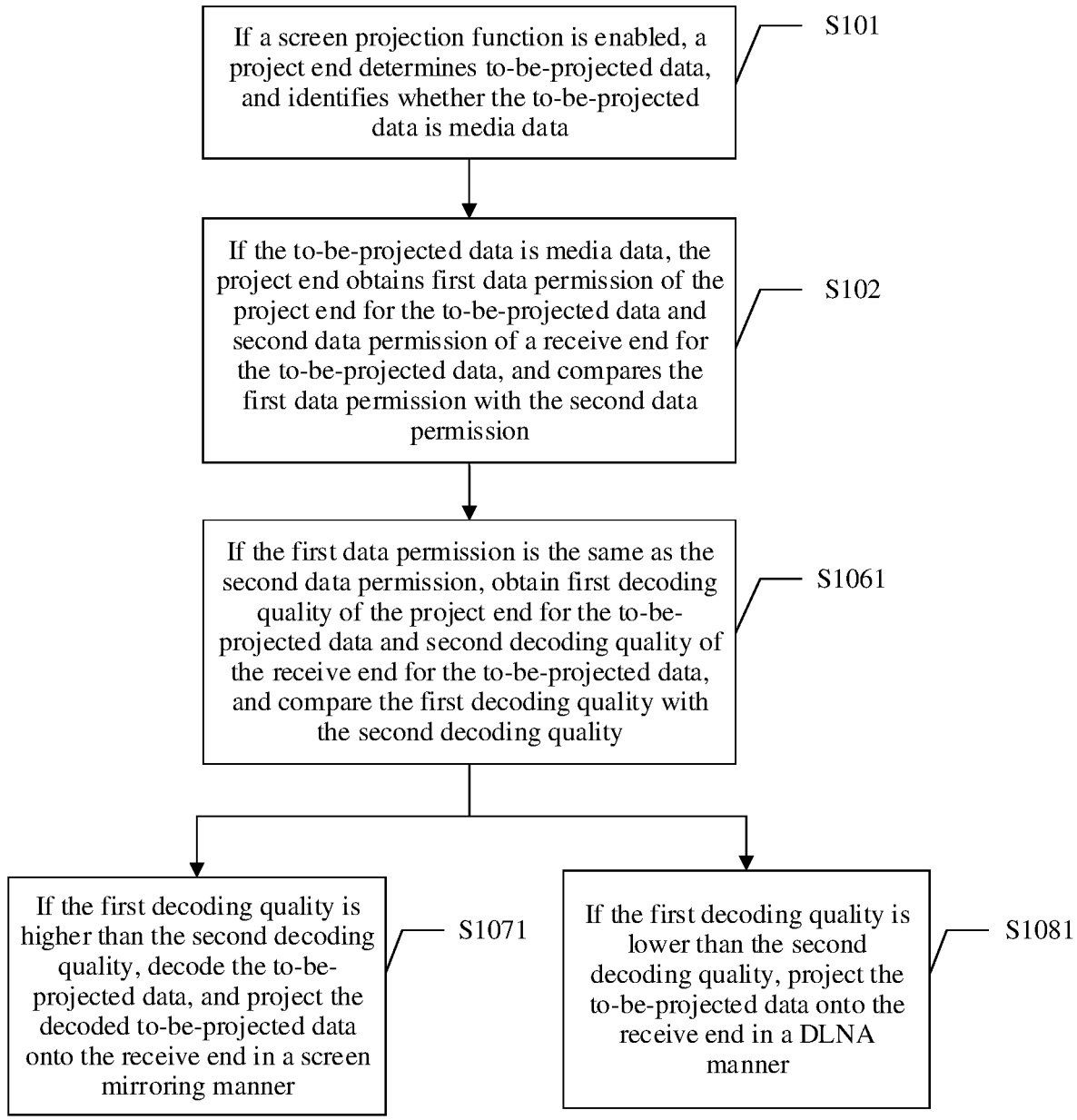
FIG. 5 is a schematic flowchart of a screen projection method according to an embodiment of this disclosure.

In an optional embodiment of this disclosure, to implement effective quantization and comparison of decoding capabilities, as shown in FIG. 5, in this embodiment of this disclosure, S106 may be replaced with the following step.

S1061: If the first data permission is the same as the second data permission, obtain first decoding quality of the project end for the to-be-projected data and second decoding quality of the receive end for the to-be-projected data, and compare the first decoding quality with the second decoding quality.

In this embodiment of this disclosure, decoding quality (including the first decoding quality and the second decoding quality) is highest playback quality supported by a terminal device (including the project end and the receive end) when the data type of the to-be-projected data is decoded and played by using a highest decoding capability, and is a quantization representation manner of a decoding capability. An example is used for description. It is assumed that a type of the to-be-projected data is a video, and it is assumed that the terminal device supports both 1080p decoding and playing of a video and 4K decoding and playing of a video. In this case, if the highest decoding capability of the terminal device is used for video decoding and playing, highest video quality supported theoretically is 4K. Therefore, decoding quality of the terminal device in this case is 4K. In this embodiment of this disclosure, the receive end only needs to return the decoding quality (that is, the second decoding quality) of the to-be-projected data.

Correspondingly, S107 and S108 may be replaced with the following steps.

S1071: If the first decoding quality is higher than the second decoding quality, decode the to-be-projected data, and project the decoded to-be-projected data onto the receive end in a screen mirroring manner.

S1081: If the first decoding quality is lower than the second decoding quality, project the to-be-projected data onto the receive end in a DLNA manner.

In an optional embodiment of this disclosure, considering that decoding capabilities of the project end and the receive end may alternatively be the same, to achieve a better screen projection effect, in this embodiment of this disclosure, a DLNA manner is preferably used for screen projection. To be specific, after S106, the method further includes the following step.

S109: Project the to-be-projected data onto the receive end in a DLNA manner if the first decoding capability is the same as the second decoding capability.

When the first decoding capability is the same as the second decoding capability, theoretically, display of the to-be-projected data played by the project end and the receive end is basically the same. However, user experience of screen mirroring and DLNA may be greatly different during actual screen projection. Therefore, to improve the overall screen projection effect, and achieve a convenient operation, the DLNA manner is used for screen projection in this embodiment of this disclosure. For a specific description of a selection reason and beneficial effects, refer to the content description of the embodiment shown in FIG. 3. Details are not described herein again.

Corresponding to the embodiment shown in FIG. 5, S109 may be replaced with the following step: Project the to-be-projected data onto the receive end in a DLNA manner if the first decoding quality is the same as the second decoding quality.

In this case, S109 may be combined with S1081 to obtain the following step: Project the to-be-projected data onto the receive end in a DLNA manner if the first decoding quality is lower than the second decoding quality, or the first decoding quality is the same as the second decoding quality.

Correspondingly, in this embodiment of this disclosure, on the basis that the project end and the receive end have same data permission for the to-be-projected data, a corresponding screen projection method decision-making table may be shown in Table 2.

TABLE 2

| Project end | Receive end | |
|---|---|---|
| | Second decoding quality | Second decoding quality |
| First decoding quality | The decoding quality of the two ends is the same, and the DLNA manner is used for screen projection | The project end has higher decoding quality, and the screen mirroring manner is used for screen projection |
| First decoding quality | The receive end has higher decoding quality, and the DLNA manner is used for screen projection | The decoding quality of the two ends is the same, and the DLNA manner is used for screen projection |

In Table 2, decoding quality comparison results of the project end and the receive end are classified into four types: the decoding quality of the project end is higher; the decoding quality of the project end and the receive end is high and the same; the decoding quality of the receive end is higher; and the decoding quality of the project end and the receive end is low and the same, and corresponding projection manners are set. During actual application, a screen projection manner may be determined based on the comparison result, to implement automatic decision on the screen projection manner.

In this embodiment of this disclosure, the data permission of the project end for the to-be-projected data and the data permission of the receive end for the to-be-projected data are first compared. When the data permission of the project end and the receive end are the same, decoding capabilities of the project end and the receive end for the to-be-projected data are compared. If the decoding capability of the project end is higher, the screen mirroring manner is used for screen projection. In this case, the higher decoding capability of the project end may be fully utilized to implement decoding and playing of the to-be-projected data. When the decoding capability of the receive end is higher, the DLNA manner is selected for screen projection. In this case, the higher decoding capability of the receive end may be fully utilized to decode and play the to-be-projected data. According to this embodiment of this disclosure, a screen projection manner can be automatically selected when data permission is the same, and a user is always provided with a higher decoding capability for to-be-projected data. Therefore, during actual screen projection, the user can view a playing effect of the to-be-projected data under the higher decoding capability. This prevents a case in which the decoding of the to-be-projected data is not smooth or even an error occurs when the decoding capability is low. The screen projection effect is clearer and smoother. Therefore, a better projection effect can be implemented, and user experience can be improved. In addition, by comparing data permission and then comparing decoding capabilities, normal play of to-be-projected data can be ensured. Then a more appropriate decoding operation may be selected to make the overall screen projection effect better. Therefore, in this embodiment of this disclosure, adaptive selection of the screen projection manner can be implemented, to achieve a better screen projection effect.

Figure 6:
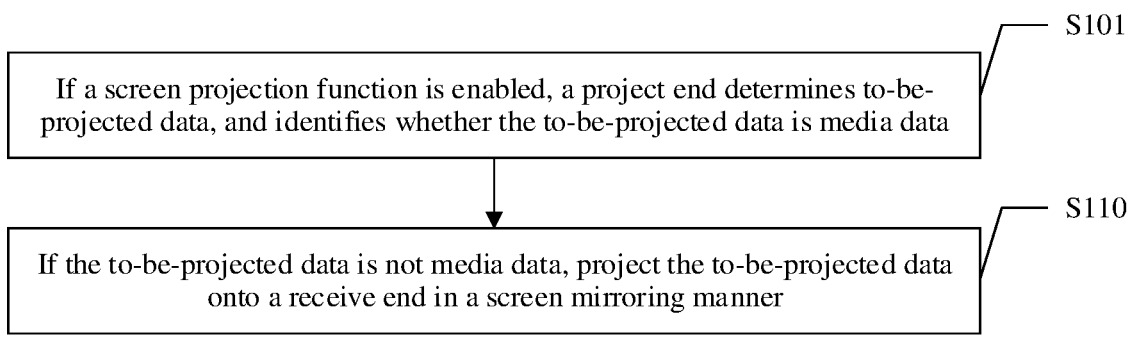
FIG. 6 is a schematic flowchart of a screen projection method according to an embodiment of this disclosure.

In an optional embodiment of this disclosure, considering that in actual application, the to-be-projected data may also be non-media data, for example, a document and a game interface, and the non-media data cannot be projected in a DLNA manner, the screen mirroring manner is used for screen projection in this embodiment of this disclosure. As shown in FIG. 6, an embodiment of this disclosure includes the following steps.

S110: If the to-be-projected data is not media data, project the to-be-projected data onto the receive end in a screen mirroring manner.

When a user needs to perform screen projection on an interface such as a game or a desktop, or needs to perform screen projection on a document, a screen projection manner is automatically selected in this embodiment of this disclosure, to perform screen recording on the interface such as the game, the desktop, or the document, and send recorded screenshot data to the receive end in a manner such as a video stream, so as to implement screen projection. For specific description of the screen projection manner of screen mirroring, refer to the description in S103. Details are not described herein again.

Figure 7:
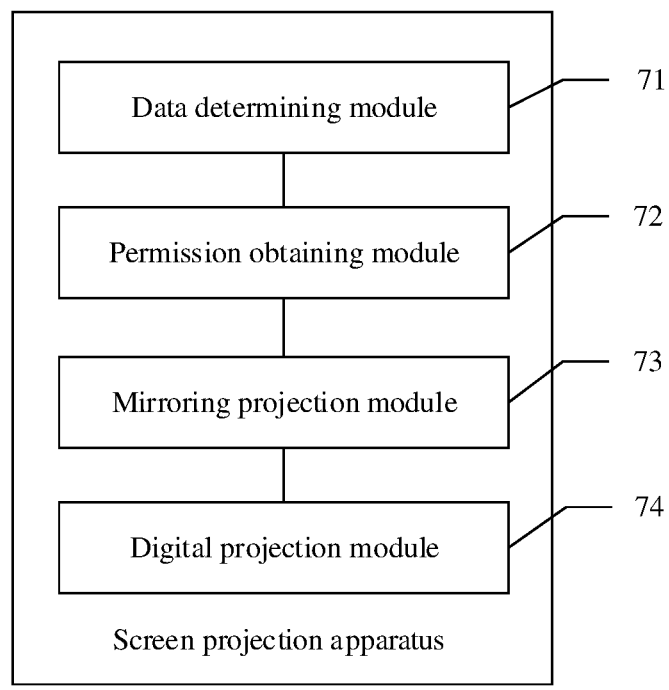
FIG. 7 is a schematic diagram of a structure of a screen projection apparatus according to an embodiment of this disclosure.

Corresponding to the screen projection method in the foregoing embodiment, FIG. 7 is a schematic diagram of a structure of a screen projection apparatus according to an embodiment of this disclosure. For ease of description, only parts related to this embodiment of this disclosure are shown.

As shown in FIG. 7, the screen projection apparatus includes:
- a data determining module 71, configured to determine to-be-projected data when a screen projection function is enabled;
- a permission obtaining module 72, configured to obtain first data permission of a project end for the to-be-projected data and second data permission of a receive end for the to-be-projected data when the to-be-projected data is media data;
- a mirroring projection module 73, configured to project the to-be-projected data onto the receive end in a screen mirroring manner if the first data permission is higher than the second data permission; and
- a digital projection module 74, configured to project the to-be-projected data onto the receive end in a DLNA manner if the first data permission is lower than the second data permission.

In an embodiment of this disclosure, the mirroring projection module 73 is further configured to:
project the to-be-projected data onto the receive end in a screen mirroring manner if the to-be-projected data is not media data.

In an embodiment of this disclosure, the digital projection module 74 is further configured to:
project the to-be-projected data onto the receive end in a DLNA manner if the first data permission is the same as the second data permission.

In an embodiment of this disclosure, the screen projection apparatus further includes:
- a decoding capability obtaining module, configured to: obtain first decoding quality of the project end for the to-be-projected data and second decoding quality of the receive end for the to-be-projected data when the first data permission is the same as the second data permission.

The mirroring projection module 73 is further configured to: project the to-be-projected data onto the receive end in a screen mirroring manner when the first decoding quality is higher than the second decoding quality.

The digital projection module 74 is configured to: project the to-be-projected data onto the receive end in a digital living network alliance manner when the first decoding quality is lower than the second decoding quality.

In an embodiment of this disclosure, the digital projection module 74 is further configured to:
project the to-be-projected data onto the receive end in a DLNA manner if the first decoding quality is the same as the second decoding quality.

In an embodiment of this disclosure, the permission obtaining module 72 includes:
- an application determining module, configured to determine, from applications installed on the project end, a first application that can play the to-be-projected data; and
- a permission obtaining submodule, configured to obtain a user account of the first application, and determine the first data permission based on the user account.

In an embodiment of this disclosure, the permission obtaining module 72 includes:
- an information sending module, configured to send first information of the to-be-projected data to the receive end; and
- a permission receiving module, configured to receive the second data permission returned by the receive end for the first information.

For a process in which each module in the screen projection apparatus provided in this embodiment of this disclosure implements a respective function, refer to descriptions of the embodiments shown in FIG. 1 to FIG. 6 and other related method embodiments. Details are not described herein again.

It should be noted that content such as information exchange between the foregoing apparatuses/units and the execution processes thereof is based on a same concept as the method embodiments of this disclosure. For specific functions and technical effects of the content, refer to the method embodiments. Details are not described herein again.

It should be understood that sequence numbers of the steps do not mean execution sequences in the foregoing embodiments. The execution sequences of the processes should be determined based on functions and internal logic of the processes, and should not be construed as any limitation on the implementation processes of embodiments of this disclosure.

It should be understood that, when used in the specification and the appended claims of this disclosure, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this disclosure refers to any combination and all possible combinations of one or more associated listed items, and includes these combinations.

As used in the specification and the appended claims of this disclosure, the term "if" may be interpreted as "when", "once", "in response to determining", or "in response to detecting" depending on the context. Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and claims of this disclosure, the terms "first", "second", "third", and the like are merely intended for the purpose of differentiated description, but shall not be understood as an indication or an implication of relative importance. It should be further understood that although the terms "first", "second", and the like are used to describe various elements in some embodiments of this disclosure, these elements should not be limited by the terms. The terms are merely used to distinguish one element from another element. For example, the first table may be named the second table, and similarly, the second table may be named the first table without departing from the scope of the various described embodiments. The first table and the second table are both tables, but they are not the same table.

Reference to "an embodiment", "some embodiments", or the like described in this specification indicates that one or more embodiments of this disclosure include a specific feature, structure, or characteristic described with reference to the embodiments. Therefore, statements such as "in an embodiment", "in other embodiments", "in some embodiments", and "in other embodiments" that appear at different places in this specification do not necessarily mean reference to a same embodiment, instead, they mean "one or more but not all of embodiments", unless otherwise specifically emphasized. The terms "include", "comprise", "have", and their variants all mean "include but are not limited to", unless otherwise specifically emphasized.

The screen projection method according to embodiments of this disclosure may be applied to a project end such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the project end and the server is not limited in embodiments of this disclosure.

For example, the project end may be a station (STATION, ST) in a WLAN, and may be a cellular phone, a personal digital assistant (Personal Digital Assistant, PDA) device, a handheld device with a wireless communication function, a computing device or another processing device connected to a wireless modem, a vehicle-mounted device, an terminal in an Internet of Vehicles, a computer, a laptop computer, a handheld communication device, a handheld computing device, a television set-top box (set top box, STB), customer premise equipment (customer premise equipment, CPE) and/or another device for communicating over a wireless system, and a next-generation communication system, for example, a terminal device in a 5G network, or a terminal device in a future evolved public land mobile network (Public Land Mobile Network, PLMN).

As an example rather than a limitation, when the project end is a wearable device, the wearable device may alternatively be a generic term for wearable devices such as glasses, gloves, watches, clothes, and shoes that are developed based on intelligent design of daily wearing by using wearable technologies. The wearable device is a portable device that can be directly worn on the body or integrated into clothes or an accessory of a user. The wearable device is not merely a hardware device, but is used to implement a powerful function through software support, data exchange, and cloud interaction. In a broad sense, wearable intelligent devices include full-featured and large-size devices that can implement complete or partial functions without depending on smartphones, such as smart watches or smart glasses, and devices that dedicated to only one type of application and need to work with other devices such as smartphones, such as various smart bands or smart jewelry for monitoring physical signs.

Figure 8:
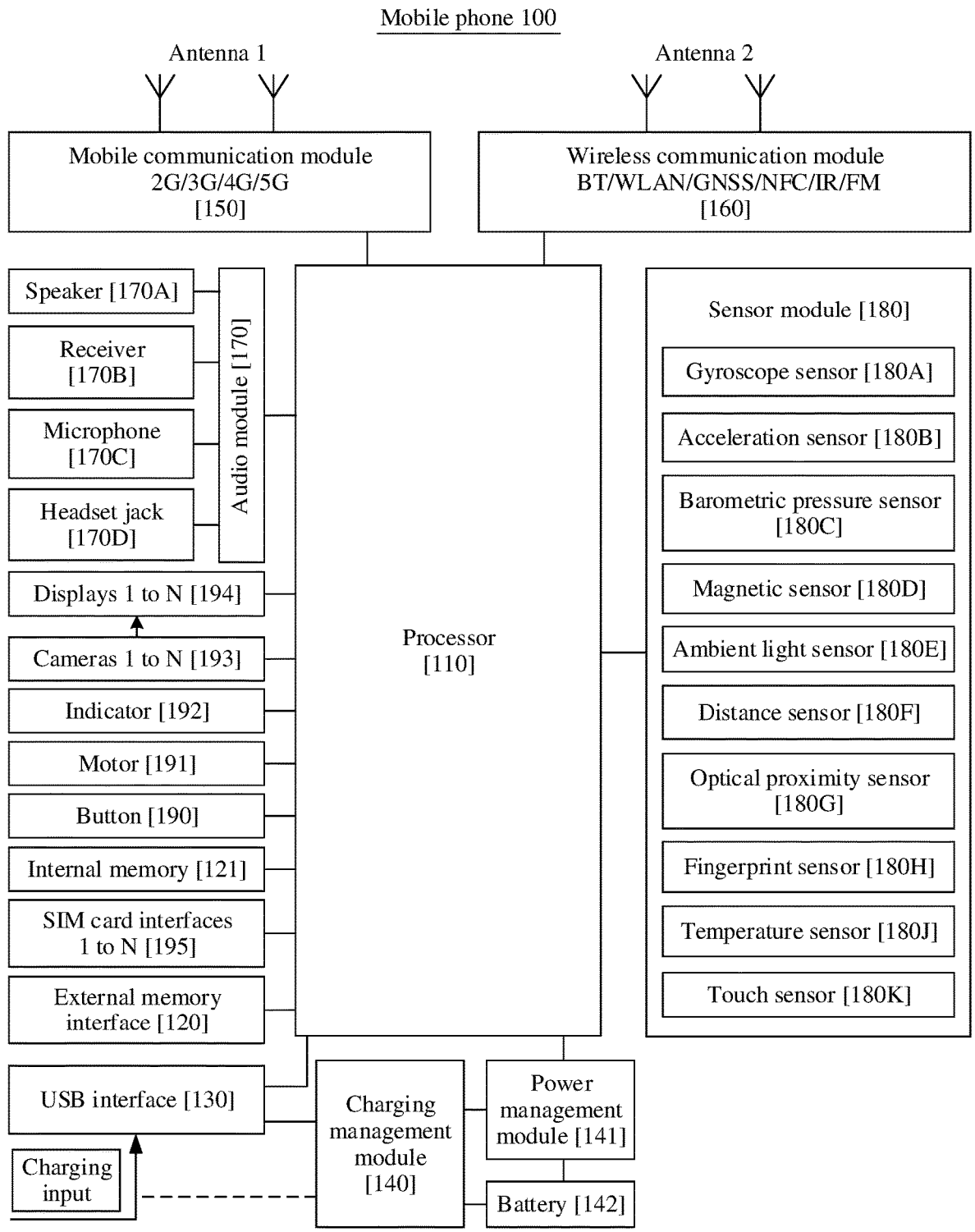
FIG. 8 is a schematic diagram of a structure of a mobile phone to which a screen projection method is applicable according to an embodiment of this disclosure.

The following uses an example in which a project end is a mobile phone. FIG. 8 is a schematic diagram of a structure of a mobile phone 100.

The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, an SIM card interface 195, and the like. The sensor module 180 may include a gyroscope sensor 180A, an acceleration sensor 180B, a barometric pressure sensor 180C, a magnetic sensor 180D, an ambient light sensor 180E, an optical proximity sensor 180G, a fingerprint sensor 180H, a temperature sensor 180J, and a touch sensor 180K (Certainly, the mobile phone 100 may further include another sensor, for example, a temperature sensor, a pressure sensor, a distance sensor, a barometric pressure sensor, or a bone conduction sensor, which is not shown in the figure).

It may be understood that an illustrated structure in this embodiment of the present invention does not constitute a specific limitation on the mobile phone 100. In other embodiments of this disclosure, the mobile phone 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the mobile phone 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

The processor 110 may run the screen projection method provided in embodiments of this disclosure, to enrich screen projection functions, improve screen projection flexibility, and improve user experience. The processor 110 may include different components. For example, when a CPU and a GPU are integrated, the CPU and the GPU may cooperate to perform the screen projection method provided in embodiments of this disclosure. For example, in the screen projection method, some algorithms are performed by the CPU, and other algorithms are performed by the GPU, to achieve high processing efficiency.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the mobile phone 100 may include one or N displays 194, where N is a positive integer greater than 1. The display 194 may be configured to display information input by a user or information provided to a user, and various graphical user interfaces (graphical user interface, GUI). For example, the display 194 may display a photo, a video, a web page, a file, or the like. For another example, the display 194 may display a graphical user interface. The graphical user interface includes a status bar, a navigation bar that can be hidden, a time and weather widget (widget), and an application icon, for example, a browser icon. The status bar includes an operator name (for example, China Mobile), a mobile network (for example, 4G), time, and a battery level. The navigation bar includes an icon of a back (back) button, an icon of a home (home) button, and an icon of a forward button. In addition, it may be understood that, in some embodiments, the status bar may further include a Bluetooth icon, a Wi-Fi icon, an icon of an externally-connected device, and the like. It may be further understood that, in some other embodiments, the graphical user interface may further include a dock bar, and the dock bar may include an icon of a frequently-used application and the like. After the processor detects a touch event of a user on an application icon by using a finger (a stylus or the like), in response to the touch event, the processor starts a user interface of an application corresponding to the application icon, and displays the user interface of the application on the display 194.

In embodiments of this disclosure, the display 194 may be one integrated flexible display, or may be a spliced display including two rigid screens and one flexible screen located between the two rigid screens. After the processor 110 executes the screen projection method provided in embodiments of this disclosure, the processor 110 may control an external audio output device to switch an output audio signal.

The camera 193 (a front-facing camera, a rear-facing camera, or a camera that may serve as both a front-facing camera and a rear-facing camera) is configured to capture a static image or a video. Generally, the camera 193 may include a photosensitive element such as a lens group and an image sensor. The lens group includes a plurality of lenses (convex lenses or concave lenses), and is configured to collect an optical signal reflected by a to-be-photographed object and transmit the collected optical signal to the image sensor. The image sensor generates an original image of the to-be-photographed object based on the optical signal.

The internal memory 121 may be configured to store computer-executable program code. The executable program code includes instructions. The processor 110 runs the instructions stored in the internal memory 121, to perform various function applications of the mobile phone 100 and data processing. The internal memory 121 may include a program storage area and a data storage area. The program storage area may store code of an operating system, an application (for example, a camera application or a WeChat application), and the like. The data storage area may store data (for example, an image or a video collected by the camera application) created during use of the mobile phone 100 and the like.

The internal memory 121 may further store one or more computer programs 1210 corresponding to the screen projection method provided in embodiments of this disclosure. The one or more computer programs 1210 are stored in the memory 121 and are configured to be executed by the one or more processors 110. The one or more computer programs 1210 include instructions, and the foregoing instructions may be used to perform steps in corresponding embodiments shown in FIG. 1 to FIG. 6. The computer program 1210 may include an account verification module 1211 and a priority comparison module 1212. The account verification module 1211 is configured to authenticate system authentication accounts of other project ends in a local area network. The priority comparison module 1212 may be configured to compare a priority of an audio output request service with a priority of a current output service of the audio output device. A status synchronizing module 1213 may be configured to synchronize a device status of an audio output device currently connected by the project end to another project end, or synchronize a device status of an audio output device currently connected by another device to a local end. When the processor 110 runs code of the screen projection method stored in the internal memory 121, the processor 110 may control the project end to perform screen projection data processing.

In addition, the internal memory 121 may include a high-speed random access memory, or may include a non-volatile memory, for example, at least one magnetic disk storage device, a flash memory, or a universal flash storage (universal flash storage, UFS).

Certainly, code of the screen projection method provided in embodiments of this disclosure may alternatively be stored in an external memory. In this case, the processor 110 may run, by using the external memory interface 120, the code of the screen projection method stored in the external memory, and the processor 110 may control the project end to perform screen projection data processing.

The following describes functions of the sensor module 180.

The gyroscope sensor 180A may be configured to determine a motion posture of the mobile phone 100. In some embodiments, angular velocities of the mobile phone 100 around three axes (namely, axes x, y, and z) may be determined by using the gyroscope sensor 180A. In other words, the gyroscope sensor 180A may be configured to detect the current motion status of the mobile phone 100, for example, the shaken or static state.

When the display in this embodiment of this disclosure is a foldable screen, the gyroscope sensor 180A may be configured to detect a folding or unfolding operation performed on the display 194. The gyroscope sensor 180A may report the detected folding operation or unfolding operation to the processor 110 as an event, to determine a folded state or an unfolded state of the display 194.

The acceleration sensor 180B may detect magnitude of accelerations of the mobile phone 100 in various directions (usually on three axes). In other words, the gyroscope sensor 180A may be configured to detect the current motion status of the mobile phone 100, for example, the shaken or static state. When the display in this embodiment of this disclosure is a foldable screen, the acceleration sensor 180B may be configured to detect a folding or unfolding operation performed on the display 194. The acceleration sensor 180B may report the detected folding operation or unfolding operation to the processor 110 as an event, to determine a folded state or an unfolded state of the display 194.

The optical proximity sensor 180G may include, for example, a light-emitting diode (LED) and an optical detector, for example, a photodiode. The light-emitting diode may be an infrared light-emitting diode. The mobile phone emits infrared light by using the light emitting diode. The mobile phone detects infrared reflected light from a nearby object by using the photodiode. When sufficient reflected light is detected, the mobile phone may determine that there is an object near the mobile phone. When insufficient reflected light is detected, the mobile phone may determine that there is no object near the mobile phone. When the display in this embodiment of this disclosure is a foldable screen, the optical proximity sensor 180G may be disposed on a first screen of the foldable display 194, and the optical proximity sensor 180G may detect a magnitude of an angle between the first screen and a second screen in a folded or unfolded state based on an optical path difference between infrared signals.

The gyroscope sensor 180A (or the acceleration sensor 180B) may send detected motion status information (for example, an angular velocity) to the processor 110. The processor no determines, based on the motion status information, whether the mobile phone is currently in a handheld state or a tripod state (for example, when the angular velocity is not 0, it indicates that the mobile phone 100 is in the handheld state).

The fingerprint sensor 180H is configured to collect a fingerprint. The mobile phone 100 may use a feature of the collected fingerprint to implement fingerprint-based unlocking, application lock access, fingerprint-based photographing, fingerprint-based call answering, and the like.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided by using the display 194. In some other embodiments, the touch sensor 180K may alternatively be disposed on a surface of the mobile phone 100, and is located on a position different from that of the display 194.

For example, the display 194 of the mobile phone wo displays a home screen, and the home screen includes icons of a plurality of applications (for example, a camera application and a WeChat application). The user taps the icon of the camera application on the home screen by using the touch sensor 180K, to trigger the processor 110 to enable the camera application and turn on the camera 193. The display 194 displays an interface of the camera application, for example, a viewfinder interface.

A wireless communication function of the mobile phone wo may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the mobile phone wo may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the mobile phone 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules of the processor 110. In this embodiment of this disclosure, the mobile communication module 150 may be further configured to exchange information with another project end, that is, send data related to screen projection to the another project end; or the mobile communication module 150 may be configured to receive a screen projection request, and encapsulate the received screen projection request into a message in a specified format.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a solution to wireless communication applied to the mobile phone 100, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. In this embodiment of this disclosure, the wireless communication module 160 may be configured to access an access point device, and send and receive a message to another project end.

In addition, the mobile phone 100 may implement an audio function, for example, music playing and recording, through the audio module 170, the speaker 170A, the receiver 170B, the microphone 170C, the headset jack 170D, the application processor, and the like. The mobile phone 100 may receive an input of the button 190, and generate a button signal input related to a user setting and function control of the mobile phone 100. The mobile phone 100 may generate a vibration prompt (for example, an incoming call vibration prompt) by using the motor 191. The indicator 192 in the mobile phone 100 may be an indicator light, may be configured to indicate a charging status and a power change, and may also be configured to indicate a message, a missed call, a notification, and the like. The SIM card interface 195 in the mobile phone 100 is configured to connect to a SIM card. The SIM card may be inserted into the SIM card interface 195 or detached from the SIM card interface 195, to implement contact with or separation from the mobile phone 100.

It should be understood that during actual application, the mobile phone 100 may include more or fewer components than those shown in FIG. 8. This is not limited in this embodiment of this disclosure. The mobile phone 100 shown in the figure is merely an example, and the mobile phone 100 may have more or fewer components than those shown in the figure, two or more components may be combined, or different component configurations may be used. Components shown in the figure may be implemented by hardware that includes one or more signal processing and/or application-specific integrated circuits, software, or a combination of hardware and software.

In addition, function units in embodiments of this disclosure may be integrated into one processing unit, or each of the units may exist alone physically, or two or more units may be integrated into one unit. The integrated unit may be implemented in a form of hardware, or may be implemented in a form of a software functional unit.

An embodiment of this disclosure further provides a computer-readable storage medium. The computer-readable storage medium stores a computer program. When the computer program is executed by a processor, steps in the foregoing method embodiments can be implemented.

An embodiment of this disclosure provides a computer program product. When the computer program product is run on a project end, the project end is enabled to implement steps in the foregoing method embodiments.

An embodiment of this disclosure further provides a chip system. The chip system includes a processor, the processor is coupled to a memory, and the processor executes a computer program stored in the memory, to implement steps in the foregoing method embodiments.

When the integrated module/unit is implemented in a form of a software functional unit and sold or used as an independent product, the integrated module/unit may be stored in a computer-readable storage medium. Based on such an understanding, all or some of the processes of the method in embodiments of this disclosure may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable storage medium may include at least any entity or apparatus that can carry the computer program code, a recording medium, a USB flash drive, a removable hard disk, a magnetic disk, an optical disc, a computer memory, a read-only memory (Read-Only Memory, ROM), a random access memory (Random Access Memory, RAM), an electrical carrier signal, a telecommunications signal, a software distribution medium, and the like.

In the foregoing embodiments, the description of each embodiment has respective focuses, or a part that is not described in detail or recorded in an embodiment, refer to related descriptions in other embodiments.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

The units described as separate components may or may not be physically separate, and parts displayed as units may or may not be physical units, may be located in one place, or may be distributed on a plurality of network units. Some or all of the units may be selected based on actual requirements to achieve the objectives of the solutions of embodiments.

The foregoing embodiments are merely intended to describe the technical solutions of this disclosure, but are not to limit this disclosure. Although this disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this disclosure, and these modifications and replacements shall fall within the protection scope of this disclosure.

In conclusion, the foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A screen projection method comprising:
   determining, by a project end, to-be-projected data when a screen projection function is enabled;

obtaining, by the project end, first data permission of the project end for the to-be-projected data and second data permission of a receive end for the to-be-projected data when the to-be-projected data is media data; and projecting, by the project end, the to-be-projected data onto the receive end in a screen mirroring manner when the first data permission is higher than the second data permission; or projecting, by the project end, the to-be-projected data onto the receive end in a digital living network alliance manner when the first data permission is lower than the second data permission.

2. The screen projection method according to claim 1, further comprising projecting, by the project end, the to-be-projected data onto the receive end in the screen mirroring manner when the to-be-projected data is not media data.

3. The screen projection method according to claim 1, further comprising projecting, by the project end, the to-be-projected data onto the receive end in the digital living network alliance manner when the first data permission is the same as the second data permission.

4. The screen projection method according to claim 1, further comprising:
obtaining, by the project end, first decoding quality of the project end for the to-be-projected data and second decoding quality of the receive end for the to-be-projected data when the first data permission is the same as the second data permission; and projecting, by the project end, the to-be-projected data onto the receive end in the screen mirroring manner when the first decoding quality is higher than the second decoding quality; or projecting, by the project end, the to-be-projected data onto the receive end in the digital living network alliance manner when the first decoding quality is lower than the second decoding quality.

5. The screen projection method according to claim 4, further comprising projecting, by the project end, the to-be-projected data onto the receive end in the digital living network alliance manner when the first decoding quality is the same as the second decoding quality.

6. The screen projection method according to claim 1, wherein the first data permission comprises:
determining, by the project end, a first application that is able to play the to-be-projected data from installed applications;
obtaining a user account of the first application; and
determining the first data permission based on the user account.

7. The screen projection method according to claim 1, wherein obtaining the second data permission comprises:
sending, by the project end, first information of the to-be-projected data to the receive end; and
receiving, by the project end, the second data permission returned by the receive end for the first information.

8. A project end comprising:
a memory configured to store a computer program; and
a processor configured to execute the computer program, the computer program including instructions for:
determining to-be-projected data when a screen projection function is enabled;
obtaining first data permission of the project end for the to-be-projected data and second data permission of a receive end for the to-be-projected data when the to-be-projected data is media data; and projecting the to-be-projected data onto the receive end in a screen mirroring manner when the first data permission is higher than the second data permission; or
projecting the to-be-projected data onto the receive end in a digital living network alliance manner when the first data permission is lower than the second data permission.

9. The projection end of claim 8, wherein the instructions further comprise projecting the to-be-projected data onto the receive end in the screen mirroring manner when the to-be-projected data is not media data.

10. The projection end of claim 8, wherein the instructions further comprise projecting the to-be-projected data onto the receive end in the digital living network alliance manner when the first data permission is the same as the second data permission.

11. The projection end of claim 8, wherein the instructions further comprise:
obtaining first decoding quality of the project end for the to-be-projected data and second decoding quality of the receive end for the to-be-projected data when the first data permission is the same as the second data permission; and projecting the to-be-projected data onto the receive end in the screen mirroring manner when the first decoding quality is higher than the second decoding quality; or
projecting the to-be-projected data onto the receive end in the digital living network alliance manner when the first decoding quality is lower than the second decoding quality.

12. The projection end of claim 11, wherein the instructions further comprise projecting the to-be-projected data onto the receive end in the digital living network alliance manner when the first decoding quality is the same as the second decoding quality.

13. The projection end of claim 8, wherein the instructions for obtaining the first data permission comprise:
determining a first application that is able to play the to-be-projected data from installed applications;
obtaining a user account of the first application; and
determining the first data permission based on the user account.

14. The projection end of claim 8, wherein the instructions for obtaining the second data permission comprise:
sending first information of the to-be-projected data to the receive end; and
receiving the second data permission returned by the receive end for the first information.

15. A non-transitory computer-readable storage medium comprising instructions that, when run on a projection end, cause the projection end to:
determine to-be-projected data when a screen projection function is enabled;
obtain first data permission of the project end for the to-be-projected data and second data permission of a receive end for the to-be-projected data when the to-be-projected data is media data; and
project the to-be-projected data onto the receive end in a screen mirroring manner when the first data permission is higher than the second data permission; or
project the to-be-projected data onto the receive end in a digital living network alliance manner when the first data permission is lower than the second data permission.

16. The computer-readable storage medium of claim 15, further comprising instructions that, when run on the projection end, cause the projection end to project the to-beprojected data onto the receive end in the screen mirroring manner when the to-be-projected data is not media data.

17. The computer-readable storage medium of claim 15, further comprising instructions that, when run on the projection end, cause the projection end to project the to-be-projected data onto the receive end in the digital living network alliance manner when the first data permission is the same as the second data permission.

18. A project end comprising:
  a chip system comprising:
    a processor and a memory coupled to the processor,
    wherein the memory is configured to store a computer program, and
    wherein the processor configured to execute the computer program, the computer program including instructions for:
      determining to-be-projected data when a screen projection function when enabled;
      obtaining first data permission of the project end for the to-be-projected data and second permission of a receive end for the to-be-projected data when the to-be-projected data is media data; and
      projecting the to-be-projected data onto the receive end in a screen mirroring manner when the first data permission is higher than the second data permission; or
      projecting the to-be-projected data onto the receive end in a digital living network alliance manner when the first data permission is lower than the second data permission.

19. The project end of claim 18, wherein the instructions further comprise projecting the to-be-projected data onto the receive end in the screen mirroring manner when the to-be-projected data is not media data.

20. The project end of claim 18, wherein the instructions further comprise projecting the to-be-projected data onto the receive end in the digital living network alliance manner when the first data permission is the same as the second data permission.

* * * * *